United States Patent
Tokarski et al.

(10) Patent No.: US 12,523,795 B2
(45) Date of Patent: Jan. 13, 2026

(54) METHOD OF PREPARING WAFERS WITH STRETCHED POLYMERS FOR WAFER THERMOFORMING AND INJECTION MOLDING OPHTHALMIC LENSES COMPRISING SAID WAFER

(71) Applicant: Essilor International, Charenton-le-pont (FR)

(72) Inventors: Zbigniew Tokarski, Dallas, TX (US); Ahmed Drammeh, Dallas, TX (US); Eric Begg, Dallas, TX (US); Mauricio Amaya Gutierrez, Dallas, TX (US)

(73) Assignee: Essilor International, Charenton-le-pont (FR)

( * ) Notice: Subject to any disclaimer, the term of this patent is extended or adjusted under 35 U.S.C. 154(b) by 664 days.

(21) Appl. No.: 17/801,557

(22) PCT Filed: Feb. 25, 2021

(86) PCT No.: PCT/EP2021/054642
§ 371 (c)(1),
(2) Date: Aug. 23, 2022

(87) PCT Pub. No.: WO2021/170698
PCT Pub. Date: Sep. 2, 2021

(65) Prior Publication Data
US 2023/0161076 A1      May 25, 2023

(30) Foreign Application Priority Data
Feb. 26, 2020  (EP) .................................. 20305182

(51) Int. Cl.
*G02B 1/04*       (2006.01)
*B29D 11/00*      (2006.01)
*G02B 1/111*      (2015.01)

(52) U.S. Cl.
CPC .......... *G02B 1/043* (2013.01); *B29D 11/0073* (2013.01); *G02B 1/111* (2013.01); *B32B 2250/40* (2013.01); *B32B 2274/00* (2013.01)

(58) Field of Classification Search
CPC ........ B29D 11/00009; B29D 11/00634; B29D 11/0073; B29C 45/14; B32B 1/00;
(Continued)

(56) References Cited

U.S. PATENT DOCUMENTS 5,178,942 A  *  1/1993  Frognet ................... B32B 27/06
                                              428/317.9
2004/0125337 A1    7/2004  Boulineau et al.
(Continued)

FOREIGN PATENT DOCUMENTS

CN         1963565        5/2007
CN       104040412        9/2014
(Continued)

OTHER PUBLICATIONS

International Search Report and Written Opinion issued in Corresponding PCT Application No. PCT/EP2021/054645, dated Aug. 19, 2021.
(Continued)

*Primary Examiner* — Philip C Tucker
*Assistant Examiner* — Jimmy R Smith, Jr.
(74) *Attorney, Agent, or Firm* — Norton Rose Fulbright US LLP (57) ABSTRACT

A method of forming an ophthalmic laminate lens, includes: forming a planar laminate (100) by adhering a first stretched polymer layer (115) to a first side of a thermoplastic elastomer layer (120), and adhering a second polymer layer (125) to a second side of the thermoplastic elastomer layer (120), the first stretched polymer layer (115) having a thickness greater than 250 pm, the second polymer layer (Continued)

(125) having a thickness greater than 250 pm, and the thermoplastic elastomer layer (120) having a thickness in a range of 15 μm to 150 μm; thermoforming the planar laminate (100) into a curved laminate (105), the curve laminate (105) having a pre-molding curvature; arranging the curved laminate (105) in a mold (145a); and molding, via the mold set (145a, 145b) at a predetermined temperature and a predetermined pressure, the curved laminate (105) with a polymer melt (140) into a curved lens, wherein a temperature of the polymer melt (140) is above a stretch temperature of the first stretched polymer layer (115).

20 Claims, 7 Drawing Sheets (58) Field of Classification Search
CPC ............ B32B 2250/03; B32B 2250/24; B32B 2250/40; B32B 2274/00; B32B 2307/4026; B32B 2307/412; B32B 2307/42; B32B 2307/516; B32B 2307/518; B32B 2307/58; B32B 2307/736; B32B 2307/738; B32B 2551/00; B32B 27/08; B32B 27/34; B32B 27/36; B32B 27/365; B32B 27/40; B32B 7/12; G02B 1/043; G02B 1/111
See application file for complete search history.

(56) References Cited

U.S. PATENT DOCUMENTS

| | | |
|---|---|---|
| 2009/0305049 A1 | 12/2009 | Kobuchi et al. |
| 2010/0033675 A1* | 2/2010 | Miyoshi ........... B29D 11/00634 264/1.32 |
| 2012/0249949 A1 | 10/2012 | Miyoshi |
| 2017/0075143 A1 | 3/2017 | Saylor et al. |
| 2017/0102558 A1 | 4/2017 | Saylor et al. |
| 2017/0205639 A1 | 7/2017 | McCabe et al. |
| 2017/0329051 A1 | 11/2017 | Vu et al. |

FOREIGN PATENT DOCUMENTS

| | | |
|---|---|---|
| CN | 107787274 | 3/2018 |
| EP | 1492658 | 1/2005 |
| JP | 2014/531058 | 11/2014 |
| WO | WO 2011/155550 | 8/2013 |
| WO | WO 2015/179538 | 11/2015 |
| WO | WO 2018/142443 | 11/2019 |

OTHER PUBLICATIONS

International Search Report and Written Opinion issued in Corresponding PCT Application No. PCT/EP2021/054642, dated May 12, 2021.

Office Action issued in corresponding Chinese Application No. 202180012555.6, dated Dec. 28, 2023.

* cited by examiner

FIG. 1A

Arc length = $d_{fw}$

METHOD OF PREPARING WAFERS WITH STRETCHED POLYMERS FOR WAFER THERMOFORMING AND INJECTION MOLDING OPHTHALMIC LENSES COMPRISING SAID WAFER

CROSS-REFERENCE TO RELATED APPLICATIONS

This application is a national phase application under 35 U.S.C. § 371 of International Application No. PCT/EP2021/054642 filed 25 Feb. 2021, which claims priority to European Patent Application No. 20305182.6 filed 26 Feb. 2020. The entire contents of each of the above-referenced disclosures is specifically incorporated by reference herein without disclaimer.

FIELD OF THE INVENTION

The present disclosure relates to laminates used to prevent contamination of the injection mold cavity caused by the outflow of the thermoplastic elastomer-based optically functional film layer during lens fabrication.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Functional optical films and/or laminates can be shaped (formed) and over-molded into lenses for photochromic, polarizer, or other functional applications. This includes methods to fabricate laminate constructions, shape the laminate into a curved wafer, and injection molding to form lenses for health or light management applications.

Injection molding of polymers, for example polycarbonate or polyamide, can be used to manufacture prescription or non-corrective eyeglass lenses. This method of polymer injection molding can be extended to over-molding of a thin, multi-layer laminate construction with a center functional film of a predetermined material that will change the overall functionality of the resulting lens. For example, a method to make corrective or non-corrective polarized sunglass lenses can utilize a multi-layer laminate that includes a layer impregnated with photochromic and/or polarizing dye as the center functional film.

The use of thermoplastic elastomer (TPE)-based materials in the construction of a laminate wafer can offer certain advantages (e.g., soft polymer segments, ductility, chemical compatibility with additives, etc.), but these advantages may lead to complications associated with producing the final lens. During injection molding of a TPE-based laminate wafer on the front (convex) power surface of a lens substrate, the high temperature and pressure in the mold can cause the softened TPE material to be squeezed and flow outward from the unrestricted edge of the wafer, leading to contamination of the mold, including the insert and mold cavity. This outflow (edge bleed, ooze) is related to the plastic/viscous flow of the center film layer at elevated temperatures with pressure applied to the wafer surface.

Thus, a method for producing lenses via injection molding without fouling the mold is desired.

SUMMARY

The present disclosure relates to a method of forming an ophthalmic laminate lens, including: forming a planar laminate by adhering a first stretched polymer layer to a first side of a thermoplastic elastomer layer, and adhering a second polymer layer to a second side of the thermoplastic elastomer layer, the first stretched polymer layer having a thickness greater than 250 µm, the second polymer layer having a thickness greater than 250 µm, and the thermoplastic elastomer layer having a thickness in a range of 15 µm to 150 µm; thermoforming the planar laminate into a curved laminate, the curve laminate having a pre-molding curvature; arranging the curved laminate in a mold; and molding, via the mold set at a predetermined temperature and a predetermined pressure, the curved laminate with a polymer melt into a curved lens, wherein a temperature of the polymer melt is above a stretch temperature of the first stretched polymer layer.

The disclosure additionally relates to an ophthalmic lens laminate, including: a first stretched polymer layer having a thickness greater than 250 µm; a second polymer layer having a thickness greater than 250 µm; and a thermoplastic elastomer layer having a thickness in a range of 15 µm to 150 µm, the thermoplastic elastomer layer being disposed between the first stretched polymer layer and second polymer layer, the thermoplastic elastomer layer being bonded to the first stretched polymer layer on a first side of the thermoplastic elastomer and bonded to the second polymer layer on a second side of the thermoplastic elastomer layer.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present disclosure can be embodied and viewed in many different ways.

Die cutting tools can be used to cut wafers from flat laminate sheets into circular or oval disks. These flat laminate wafers are then thermoformed into a spherical dome shape. The diameter of the flat laminate wafers is determined by considering, at least, one or more of: the desired lens diameter (e.g., 70 mm, 76 mm, 80 mm, etc.), the base curve of the thermoformed wafer (e.g., 0.25, 1.75, 3.00, 4.00, 4.50, 5.50, 6.00, 6.50, 7.25, 8.00 D, etc.), and the base curve of the mold insert (e.g., 1.75, 2.25, 3.25, 4.25, 5.50, 6.50, 7.50, 8.50 D, etc.). The base curve of the mold insert can be the same base curve as the convex power surface of the lens.

Thermoplastic elastomers offer many beneficial properties when used as the main matrix for the functional center layer. The soft polymer segments offer flexibility and additive compatibility while the harder segments offer rigidity and stiffness. However, thermoplastic elastomers (e.g., aliphatic thermoplastic polyurethanes, polyether-block-amide polyurethanes, etc.) are a class of polymers that can deform and flow under typical thermoforming and molding operations, leading to edge bleed and ooze.

A method as disclosed herein addresses, at least, the challenge associated with the outflow of the optically functional thermoplastic elastomeric (TPE) material from between the outer transparent polymer film layers, for example transparent polycarbonate film layers, during any of the wafer processing steps. Under the high temperature and pressure conditions of injection molding, this inner layer will soften and flow out from the laminate wafer in a radial direction to contaminate the mold cavity. By incorporating a mono-oriented (MO) or biaxial-oriented (BO) stretched polymer film, for example a stretched polycarbonate film, on the eventual concave surface of the laminate wafer, the diameter of this stretched film can shrink (due to heat) during thermoforming and/or injection overmolding so that the edge of the film will rescind (move away) from the lens edge while leaving the cooler polymer film, for example a polycarbonate film, on the convex side at or near its original diameter. This can decrease the amount of TPE that is available to bleed or ooze out from the edge of the laminate and contaminate the mold cavity, the interstitial region between the concave insert and cavity wall, and the insert surface. In particular, stretched, transparent polymer films, for example stretched, transparent polycarbonate films, on the convex and concave side of the TPE optical film can be used to produce a flat laminate, a curved wafer, and an optically functional (for example photochromic) lens (prescription or non-corrective).

Figure 1A:
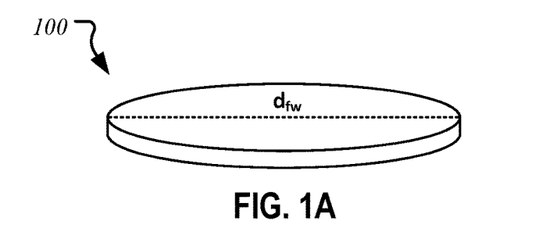
FIG. 1A is a schematic of a flat laminate wafer, according to an embodiment of the present disclosure.

FIG. 1A is a schematic of a flat laminate wafer 100, according to an embodiment of the present disclosure. FIG. 1A shows diameters and base curves of various components involved in cutting, thermoforming, and molding. In an embodiment, a diameter, $d_{fw}$, of a circular flat wafer is the same length as an arc length of the flat laminate wafer 100 after thermoforming.

Figure 1B:
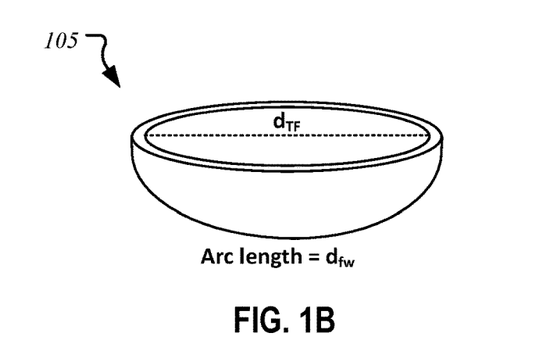
FIG. 1B is a schematic of a thermoformed laminate wafer, according to an embodiment of the present disclosure.

FIG. 1B is a schematic of a thermoformed laminate wafer 105, according to an embodiment of the present disclosure. In an embodiment, a cord length, $d_{TF}$, of the thermoformed laminate wafer 105 can be approximately the same diameter as a diameter of the lens.

Figure 1C:
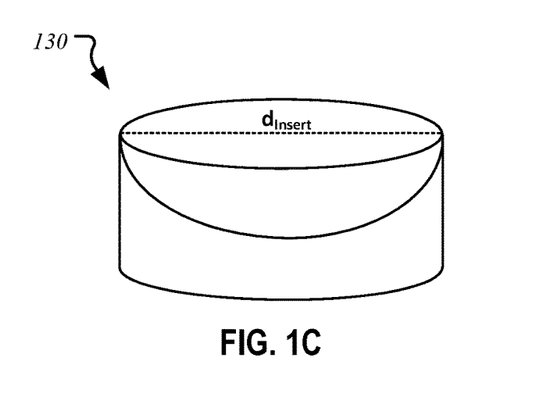
FIG. 1C is a schematic of a concave mold insert, according to an embodiment of the present disclosure.

FIG. 1C is a schematic of a concave mold insert 130, according to an embodiment of the present disclosure. In an embodiment, the diameter of the lens can be determined by, for example, a diameter, $d_{Insert}$, of the concave mold insert 130. Thus, both the chord length ($d_{TF}$) and the concave mold insert 130 diameter ($d_{Insert}$) can be smaller in diameter than the diameter ($d_{fw}$) of the flat laminate wafer 100. The arc length of the concave mold insert 130 is equal to or greater than the arc length of the thermoformed laminate wafer 105 due to the differences in the base curves of the flat laminate wafer 100 and the concave mold insert 130.

Figure 1D:
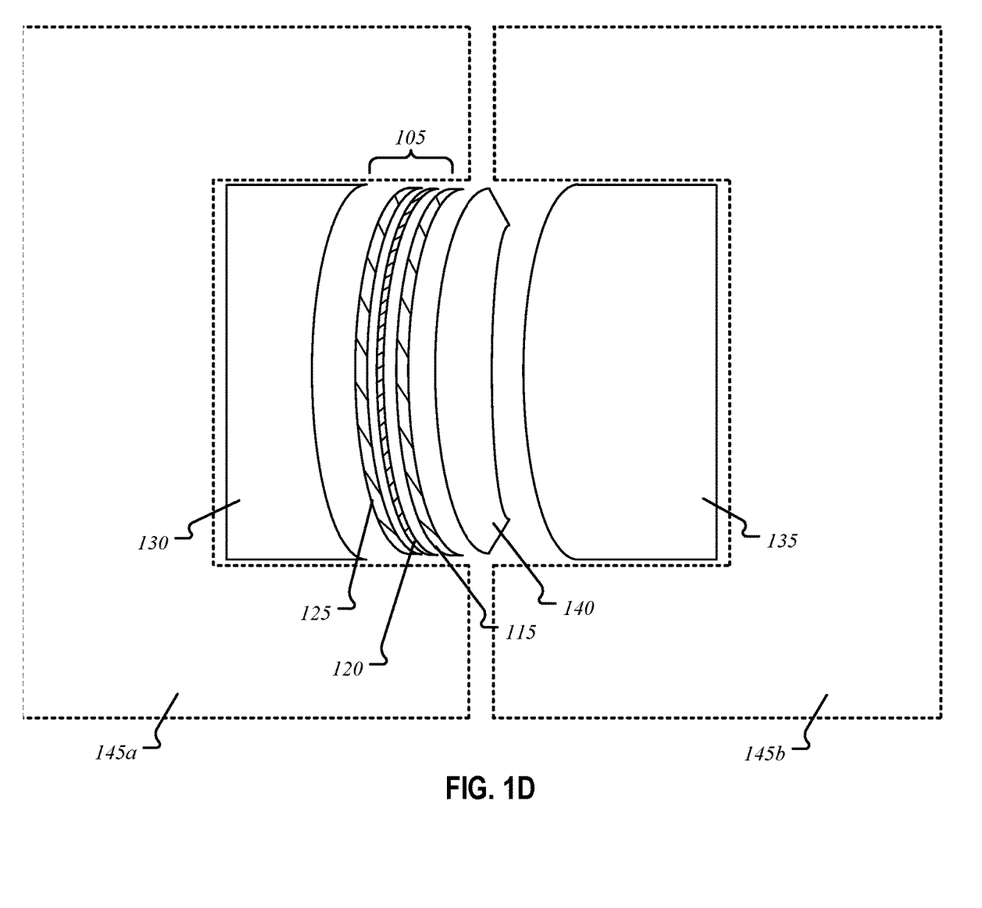
FIG. 1D is a schematic of a molding device, according to an embodiment of the present disclosure.

FIG. 1D is a schematic of a molding device, according to an embodiment of the present disclosure. In an embodiment, the molding device can include a first mold side 145a, a second mold side 145b, the concave mold insert 130, and a convex mold insert 135. The first mold side 145a and the second mold side 145b can each include a hollow portion, wherein the concave mold insert 130 and the convex mold insert 135 can be removeably disposed therein. As shown in FIG. 1D, the first mold side 145a including the concave mold insert 130 can be configured to couple with the second mold side 145b including the convex mold insert 135. Upon coupling, the concave mold insert 130 and the convex mold insert 135 can form a cavity connected to a hollow line formed by the coupling of the first and second mold sides 145a, 145b. The line can be configured to receive a polymer, for example, via a screw feeder or similar device. The cavity can be configured to receive the thermoformed laminate wafer 105. A curvature of the concave mold insert 130 and a curvature of the convex mold insert 135 can determine a lens power of the resulting lens. For a semi-finished lens, a curvature along a convex side of the lens is fixed and the concave side of the lens can be modified after molding, for example via grinding and polishing. Note that multiple lines for receiving the polymer can be connected, such that an injection of the polymer from a source can fill multiple mold devices with a single injection and allow for parallel fabrication of multiple lenses.

Prior to placement in the molding device, the flat laminate wafer 100 can be thermoformed into the spherical dome shape of the thermoformed laminate wafer 105, for example via a thermoforming machine. During thermoforming, the flat laminate wafer 100 can be placed onto a heated thermoforming insert, and a vacuum force can be applied to secure the flat laminate wafer 100 to the thermoforming insert. By adjusting a temperature of the applied heat and a force of the applied vacuum, the flat laminate wafer 100 can be formed to the curved shape of the thermoforming insert to produce the thermoformed laminate wafer 105.

In an embodiment, the flat laminate wafer 100 can include a first layer 115, a center layer 120, and a second layer 125. As shown in FIG. 1D, thermoforming the flat laminate wafer 100 can produce a curved structure with the first layer 115 being a concave side and the second layer 125 being a convex side.

In an embodiment, the thermoformed laminate wafer 105 can be arranged in the molding device adjacent to the concave mold insert 130, wherein the convex side of the thermoformed laminate wafer 105 (i.e. the second layer 125) is adjacent to the concave mold insert 130. The thermoformed laminate wafer 105 rests against the concave mold insert 130 and an edge of the thermoformed laminate wafer 105 extends out to an edge of the concave mold insert 130 ($d_{TF}=d_{Insert}$) to secure the thermoformed laminate wafer 105 in the mold cavity. Smaller diameter flat laminate wafers 100 can be used when the thermoformed laminate wafer 105 base curve is smaller than the base curve of the concave mold insert 130 to maintain a constant cord length (or lens diameter), i.e., the cord length for all thermoformed laminate wafer 105 base curves preferably equals the concave mold insert 130 diameter to prevent the thermoformed laminate wafer 105 from falling out of the cavity during loading operations. This is particularly relevant when vacuum is used and a seal is needed between the thermoformed laminate wafer 105 and the concave mold insert 130.

Also note that the circumference of the flat laminate wafers 100 can be larger than that of the thermoformed laminate wafer 105 by the ratio of $d_{fw}/d_{TF}$. Above a predetermined ratio, edge deformation occurs and the extra length at the edge of the flat laminate wafer 100 can be accommodated by compression, out-of-plane deformation, buckling, or crease formation at the edge of the thermoformed laminate wafer 105.

The flat laminate wafer 100 can be thermoformed to mid (4.00 D, diopters of radius of curvature) to high (8.50 D) base curves where the diameter of the flat laminate wafer 100, $d_{fw}$, is much greater than the diameter of the thermoformed laminate wafer 105, $d_{TF}$. The ability to successfully subject a laminate structure (e.g., the flat laminate wafer 100) under forces of tension and compression without failure is substantially based on mechanical properties of the composition of the laminate. Mechanical properties such as rigidity, ductility and elasticity play a major role in the thermoforming of the flat laminate wafer 100. The use of (>50 microns), softer, and more ductile materials for the center layer 120 compounds the likelihood of defects. Commonly observed wafer defects include buckling and crease formation at any alignment or centering tab. Increasing rigidity of the flat laminate wafer 100 via adjust thicknesses of the layers is described herein. It may be appreciated that known devices and methods can be used to thermoform the flat laminate wafer 100, for example a LEMA of Italy machine that incrementally increases the curvature of the flat laminate wafer 100 under applied heat.

Figure 2A:
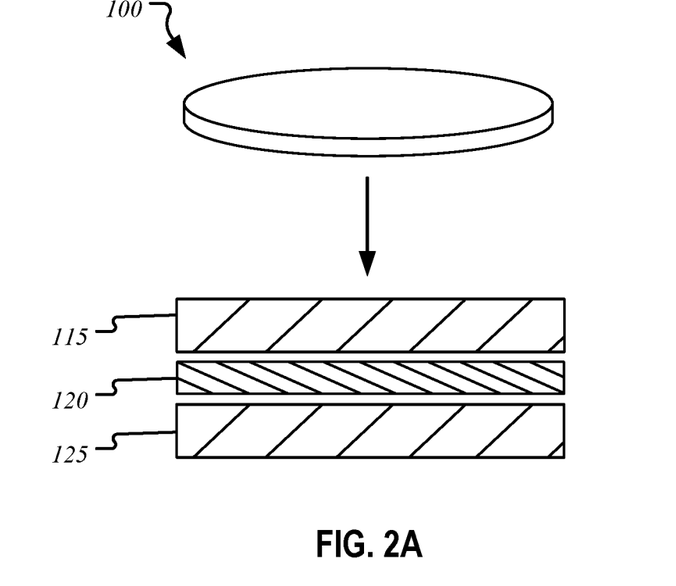
FIG. 2A is a schematic of layers in a flat laminate wafer, according to an embodiment of the present disclosure.

FIG. 2A is a schematic of the layers in the flat laminate wafer 100, according to an embodiment of the present disclosure. It may be appreciated that techniques known by those in the art can be used to fabricate the flat laminate wafer 100. In an example, adhesive lamination can be utilized, wherein the first layer 115 and the second layer 125 are bonded to the center layer 120 using an adhesive and brought into close proximity by a pair of nipped rollers. The nipped rollers can be configured to facilitate the spreading of the adhesive, controlling the thickness of the flat laminate wafer 100, and for squeezing the layers together. In another example, extrusion lamination can be utilized, wherein a hot molten center layer 120 is sandwiched between the first layer 115 and the second layer 125. The thickness in this example can be adjusted via the nipped roller gap setting. In another example, adhesive coating lamination can be utilized, wherein the center layer 120 can be solvent cast on a carrier film and dried. In this state, the center layer 120 is more adhesive and tacky, allowing it to be transferred from the carrier film to the first layer 115 and the second layer 125 using a pair of nipped rollers that are configured to pressure seal the layers together. Thus, as described above, an optional adhesive can be disposed between the center layer 120 and the outer first and second layers 115, 125 in some examples. In other examples, the layers can be bonded directly.

The center layer 120 can be an optically functional thermoplastic elastomeric resin. In an example, the center layer 120 can be thermoplastic polyurethane (TPU). In another example, the center layer 120 can be semi-crystalline polyether-block-polyamides (PEBA). Notably, optical additives (e.g., photochromic dye, tint dye, dye absorbers of selective wavelengths, electrochromic dyes, and the like) can be blended with the center layer 120 to produce an optically functional film. The first layer 115 and the second layer 125 can be, for example, polycarbonate, cellulose esters (e.g., cellulose triacetate), acrylics, cyclic olefin copolymers, and the like, and optically transparent with little to no haze.

Thermoplastic elastomers can provide beneficial properties when used as the main matrix for the center layer 120. Block copolymers can include soft polymer segments that offer flexibility and additive compatibility while the harder segments offer rigidity and stiffness. However, TPEs (e.g., amorphous thermoplastic polyurethane, semicrystalline polyether-block-amide, etc.) are a class of polymers that can easily deform and flow under typical thermoforming and molding operations, leading to edge bleed and ooze. This can lead to contamination in the molding device, for example on walls of the cavity and surfaces of the concave and convex inserts 130, 135. This can lead to contamination of surfaces of the resulting fabricated lenses (both the convex surface and outer edges of the lens), which can cascade downstream in the manufacturing process to contaminate other instruments, for example a wet coating system. Furthermore, the TPE can fill a clearance volume between the first and second mold sides 145a, 145b and the concave and convex mold inserts 130, 135, making it difficult to remove the concave and convex mold inserts 130, 135 from the molding device.

Figure 2B:
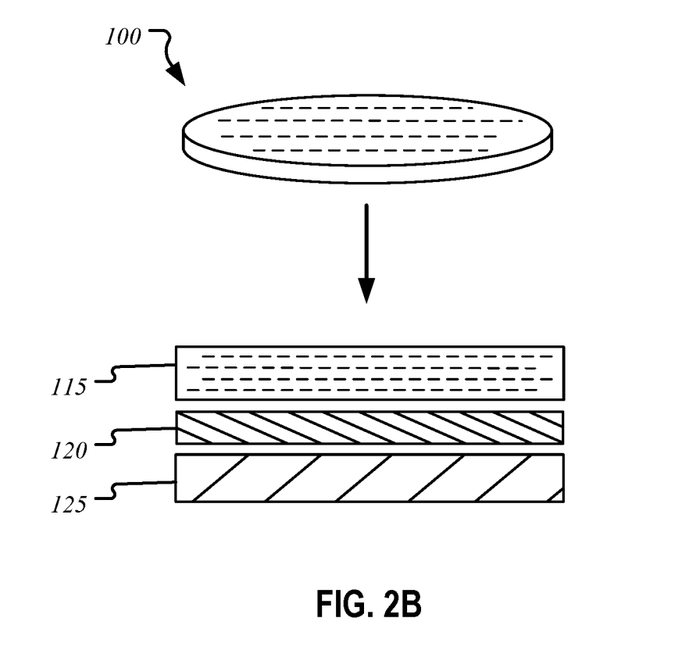
FIG. 2B is a schematic of layers in a flat laminate wafer including an asymmetric stretched polymer structure, according to an embodiment of the present disclosure.

FIG. 2B is a schematic of the layers in the flat laminate wafer 100 including an asymmetric stretched polymer structure, according to an embodiment of the present disclosure. In an embodiment, the flat laminate wafer 100 can include the first layer 115, the center layer 120, and the second layer 125, wherein the first layer 115 is the stretched polymer. For example, the first layer 115 is stretched polycarbonate, wherein the polycarbonate can be mono-axially or bi-axially stretched. The thickness of the first layer 115 can be greater than 250 µm. For example, the thickness of the first layer 115 can be in the range of 300 to 800 µm. The thickness of the second layer 125 can be greater than 250 µm. For example, the thickness of the second layer 125 can be in the range of 300 to 800 µm. The thickness of the center layer 120 can be in the range of, for example, 15 to 150 µm. The flat laminate wafer 100 (and thermoformed laminate wafer 105) can also include an alignment tab to prevent movement of the flat laminate wafer 100 over the lens edge near the alignment tab and to keep the thermoformed laminate wafer 105 centered when arranged in the concave molding insert 130. This structure can be used in FIG. 3A.

The stretched polymer, for example stretched polycarbonate, can be fabricated, for example, via stretching over a series of rollers set at a predetermined stretch temperature and stretch rate. The predetermined stretch temperature can be, for example, equal to or greater than the glass transition temperature of the polymer, for example polycarbonate. The roller heating can be gradually increased as the polymer, for example polycarbonate, travels downstream in the roller series to raise the temperature of the polymer, for example polycarbonate, in order to facilitate the elongation of the film. For mono-axially stretched polymer, for example mono-axially stretched polycarbonate, the rollers can stretch the polymer, for example polycarbonate, along the direction the polymer, for example polycarbonate, travels between rollers. For bi-axially stretched polymer, for example bi-axially stretched polycarbonate, the monoaxially stretched polymer, for example monoaxially stretched polycarbonate, can be stretched in a second direction transverse to the direction the polymer, for example polycarbonate, travels between rollers. This second, transverse direction stretching can be performed, for example, via a series of gripping devices that attach to edges of the polymer film, for example a polycarbonate film, and pull apart in the second direction. This pulling can be performed in an oven set at the predetermined stretch temperature to raise the temperature of the polymer, for example polycarbonate, in order to facilitate the elongation of the film. By stretching the polymer, for example polycarbonate, at the predetermined stretch temperature and subsequently cooling the polymer, for example polycarbonate, the polymer, for example polycarbonate, remains in the stretched state until the polymer, for example polycarbonate, is exposed to the predetermined stretch temperature again, whereupon the stretched polymer, for example stretched polycarbonate, can reversibly relax and contract.

Figure 2C:
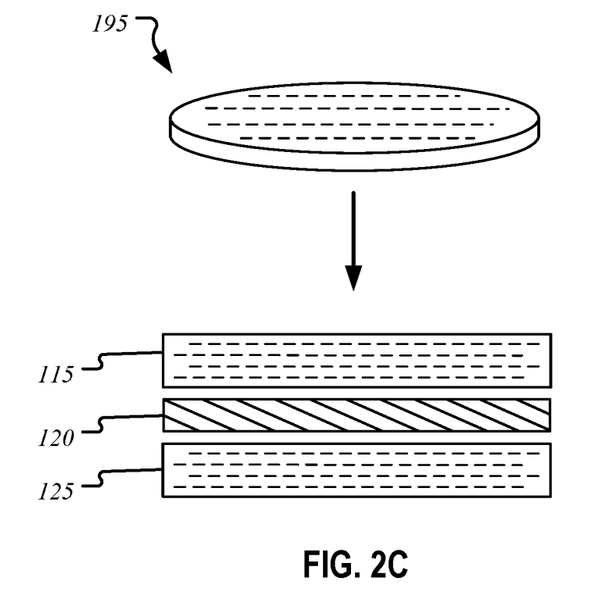
FIG. 2C is a schematic of layers in a flat laminate wafer including a symmetric stretched polymer structure, according to an embodiment of the present disclosure.

FIG. 2C is a schematic of the layers in the flat laminate wafer 100 including a symmetric stretched polymer structure, according to an embodiment of the present disclosure. In an embodiment, the flat laminate wafer 100 can include the first layer 115, the center layer 120, and the second layer 125, wherein the first layer 115 and the second layer 125 are the stretched polymer. For example, the first layer 115 is stretched polycarbonate. The thickness of the first layer 115 can be greater than 250 µm. For example, the thickness of the first layer 115 can be in the range of 300 to 800 µm. The thickness of the second layer 125 can be greater than 250 µm. For example, the thickness of the second layer 125 can be in the range of 300 to 800 µm. The thickness of the first layer 115 and the second layer 125 can be substantially equal, for example, within a 5 µm fabrication tolerance. The thickness of the center layer 120 can be in the range of, for example, 15 to 150 µm. The flat laminate wafer 100 (and thermoformed laminate wafer 105) can again include the alignment tab. This structure can be used in FIG. 3B.

As previously mentioned, prior to placement in the molding device, the flat laminate wafer 100 can be thermoformed into the spherical dome shape of the thermoformed laminate wafer 105, for example via a thermoforming machine. During the thermoforming process, the non-stretched polymer second layer 125, for example a non-stretched polycarbonate second layer 125, of the flat laminate wafer 100 can be arranged on a curved former surface (e.g. a thermoformer insert) and the stretched polymer first layer 115, for example a stretched polycarbonate first layer 115, of the flat laminate wafer 100 can be exposed to a heating source in the thermoforming machine.

In an embodiment, only the first layer 115 is stretched polymer, for example stretched polycarbonate, and one (for mono-axial) or both (for biaxial) of the axes of the stretched polymer first layer 115, for example a stretched polycarbonate first layer 115, on the concave side of the thermoformed laminate wafer 105 can partially shrink when the heating source causes the temperature of the stretched polymer first layer 115, for example a stretched polycarbonate first layer 115, to increase above the predetermined stretch annealing temperature (i.e., the stretch freezing temperature). This is possible because the TPE material of the center layer 120 softens, deforms, and/or flows before the predetermined stretch annealing temperature is reached, and this decouples the interdependence of the convex second layer 125 and the concave first layer 115. As a result, the diameter of the outer convex second layer 125 is slightly larger than the diameter of the inner concave first layer 115 (in either one or both film axes).

In an embodiment, the heating source in the thermoforming machine is configured to keep the temperature of the stretched polymer first layer 115, for example a stretched polycarbonate first layer 115, below the predetermined stretch temperature to prevent partial or full shrinkage.

Figure 3A:
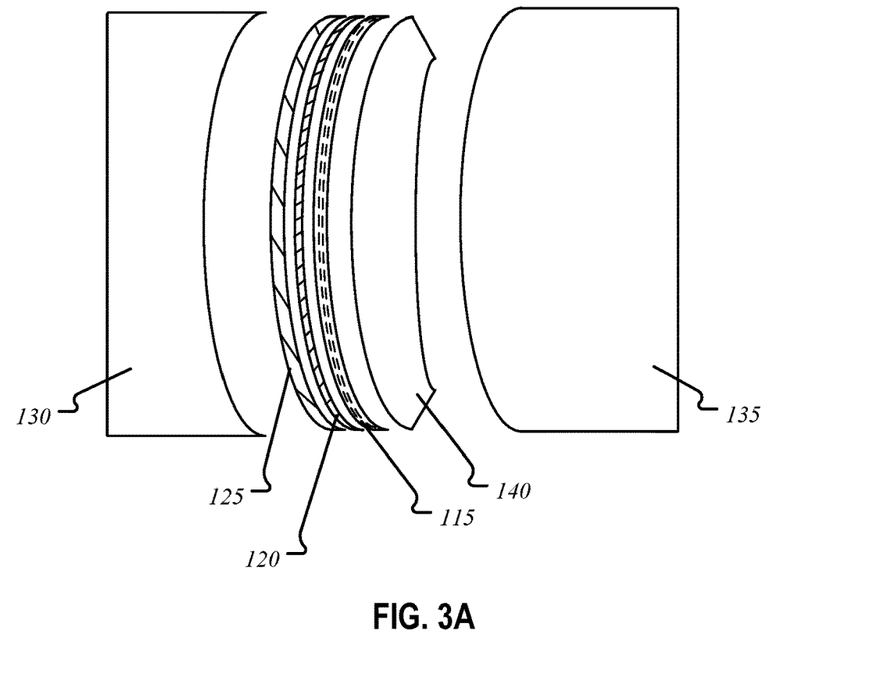
FIG. 3A is a schematic of a thermoformed laminate wafer with a stretched polymer for a first layer, according to an embodiment of the present disclosure.

FIG. 3A is a schematic of the thermoformed laminate wafer 105 with the stretched polymer for the first layer 115, according to an embodiment of the present disclosure. In an embodiment, the thermoformed laminate wafer 105 is arranged in the cavity such that the stretched polymer for the first layer 115 is adjacent to where the polymer melt 140 will be injected into the cavity. Starting with an open mold device, the thermoformed laminate wafer 105 is arranged adjacent to the concave mold insert 130. The first mold side 145a with the concave mold insert 130 housed therein is brought together to couple with the second mold side 145b with the convex mold insert 135 housed therein. This may be performed by, for example, a hydraulic or electrical press pushing one of the mold sides 145*a*, 145*b* to close against the other. After coupling the mold sides 145*a*, 145*b*, the polymer melt 140 (e.g., molten polycarbonate) is injected into the cavity of the mold device between the thermoformed laminate wafer 105 and the convex mold insert 135. In some implementations, the polymer melt 140 includes a transparent or semi-transparent thermoplastic material, such as polycarbonate, thermoplastic urethane, polyacrylate, polyester, copolyester, polymethacrylate, poly(methyl methacrylate), polystyrene, polyamide, polysulfone, polyphenylsulfone, polyetherimide, polypentene, polyolefin, ionomer, ethylene methacrylic acid, cyclic olefin copolymer, acrylonitrile, styrene maleic anhydride, a copolymer thereof, or a derivative or mixture thereof.

The polymer melt 140 slowly cools inside the mold over time, bonds with the thermoformed laminate wafer 105, and can be ejected from the mold device when the mold sides 145*a*, 145*b* are decoupled. The mold sides 145*a*, 145*b* can be independently thermally controlled. The concave and convex mold inserts 130, 135 can also be independently thermally controlled or rely on the mold sides 145*a*, 145*b* for heat dissipation. That is, the concave and convex mold inserts 130, 135 can be thermally coupled to the mold sides 145*a*, 145*b*, and the mold sides 145*a*, 145*b* can be large enough of a heat sink to absorb heat transferred from the polymer melt 140 to the concave and convex mold inserts 130, 135 during cooling.

In an embodiment, the stretched polymer first layer 115 can shrink as a result of elevating the temperature of the stretched polymer above the predetermined stretch annealing (freeze) temperature via heat transfer from the polymer melt 140. This stretched polymer first layer 115 can shrink from the edge of the non-shrinking second layer 125 on the opposite side of the thermoformed laminate wafer 105. A direction of the first layer 115 shrinkage can be along the stretch direction of the polymer during fabrication. The cooler temperature of the concave mold insert 130 that is thermally coupled to the first mold side 145*a* is below the predetermined stretch annealing temperature and thus the temperature of the second layer 125 can stay below the predetermined stretch annealling temperature. The first mold side 145*a* temperature (and by way of thermal conduction, the concave mold insert 130 temperature) can be kept much cooler (e.g. >120° C. cooler) via cooling means, for example, internally circulated chilled water-based or oil-based fluid through the first mold side 145*a*. The second mold side 145*b* temperature (and by way of thermal conduction, the convex mold insert 135 temperature) can similarly be maintained.

The mechanism of preventing outflow of the center layer 120 (edge bleeding, oozing, etc.) is described as follows. The stretched polymer first layer 115 shrinks due to the heat from the polymer melt 140 while the diameter of the second layer 125 remains relatively unchanged. The stretched polymer first layer 115 pulls the center layer 120 away from the edges of the thermoformed laminate wafer 105 as it shrinks. The shrinkage prevents the TPE material of the center layer 120 from spilling over the edges of the resulting lens and contaminating the resulting lens itself. The shrinkage also prevents the TPE material of the center layer 120 from reaching and contaminating sidewalls of the cavity of the molding device. The shrinkage of the first layer 115 and the center layer 120 can also allow the polymer melt 140 to fill in along the edges of the first layer 115 and the center layer 120, thus essentially encapsulating the first layer 115 and the center layer 120 in the polymer melt 140.

Figure 3B:
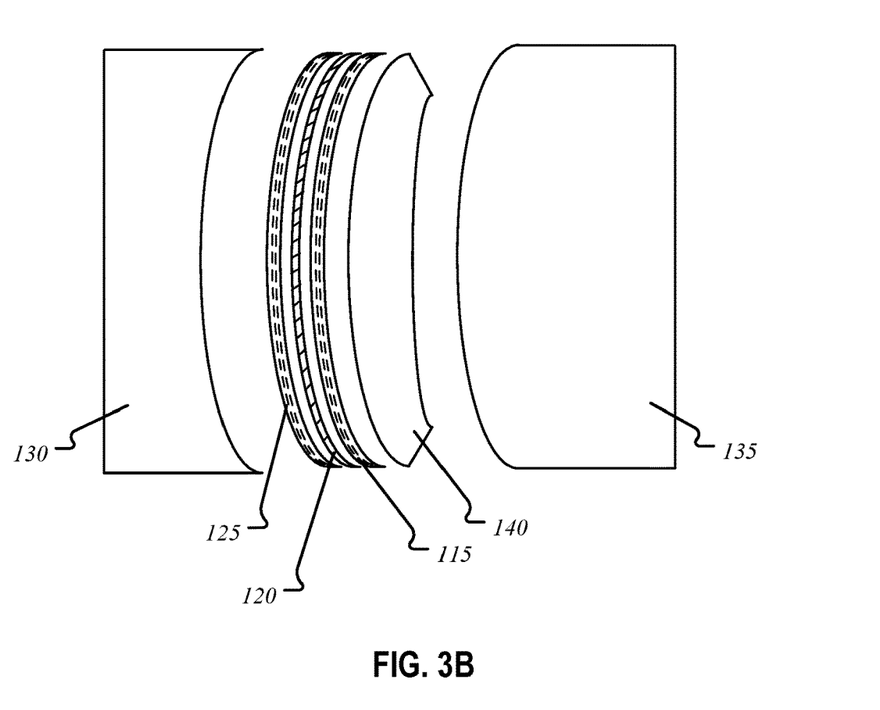
FIG. 3B is a schematic of a thermoformed laminate wafer with a stretched polymer for both a first layer and a second layer, according to an embodiment of the present disclosure.

FIG. 3B is a schematic of the thermoformed laminate wafer 105 with the stretched polymer for both the first layer 115 and the second layer 125, according to an embodiment of the present disclosure. In an embodiment, the thermoformed laminate wafer 105 is arranged in the cavity such that the stretched polymer for the first layer 115 is adjacent to where the polymer melt 140 will be injected into the cavity and the stretched polymer for the second layer 125 is arranged adjacent to the concave mold insert 130.

Figure 3C:
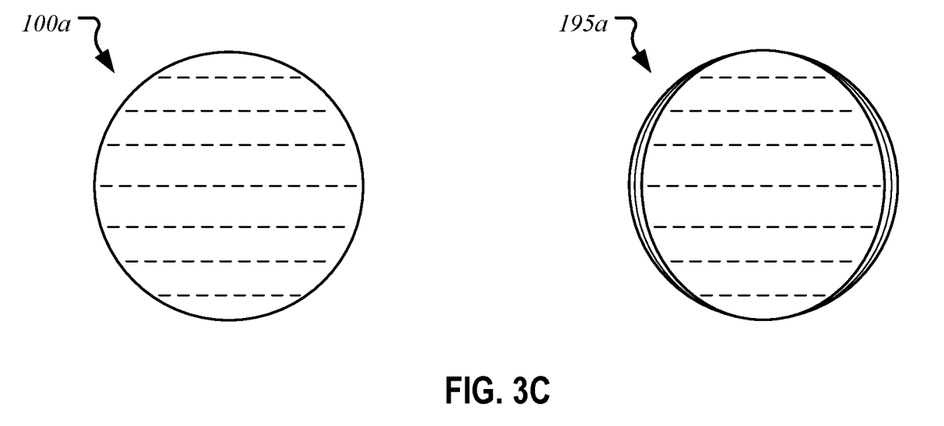
FIG. 3C is a top-view schematic of a flat laminate wafer before and after mono-axial shrinkage, according to an embodiment of the present disclosure.

FIG. 3C is a top-view schematic of a mono-axially stretched flat laminate wafer 100*a* before and after mono-axial shrinkage, according to an embodiment of the present disclosure. As shown, after thermoforming and injection molding to form a mono-axially stretched lens 195*a*, the stretched polymer in the first layer 115 can mono-axially shrink along a single direction, leading to opposite edges of the first layer 115 (and concomitantly, the center layer 120) receding from the diameter of the mono-axially stretched lens 195*a* along the direction of the shrinkage.

Figure 3D:
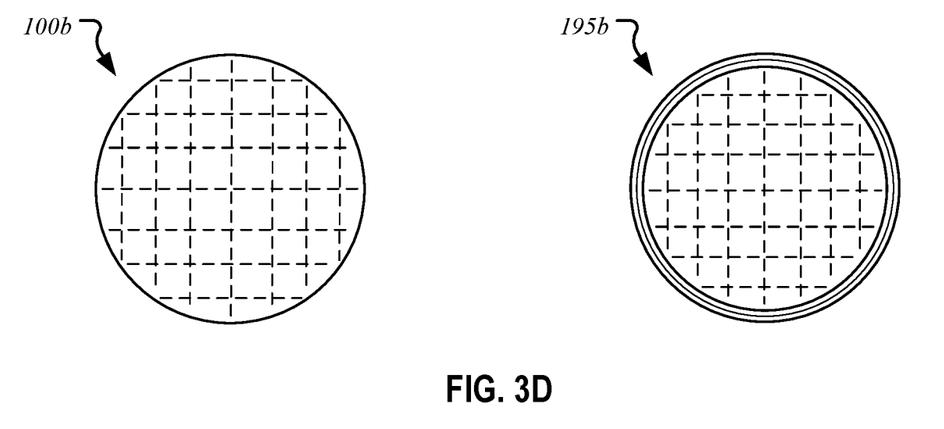
FIG. 3D is a top-view schematic of a flat laminate wafer before and after bi-axial shrinkage, according to an embodiment of the present disclosure.

FIG. 3D is a top-view schematic of a bi-axially stretched flat laminate wafer 100*b* before and after bi-axial shrinkage, according to an embodiment of the present disclosure. As shown, after thermoforming and injection molding to form a bi-axially stretched lens 195*b*, the stretched polymer in the first layer 115 can bi-axially shrink, leading to an entire circumference of the first layer 115 (and concomitantly, the center layer 120) receding from the diameter of the bi-axially stretched lens 195*b*.

Figure 4:
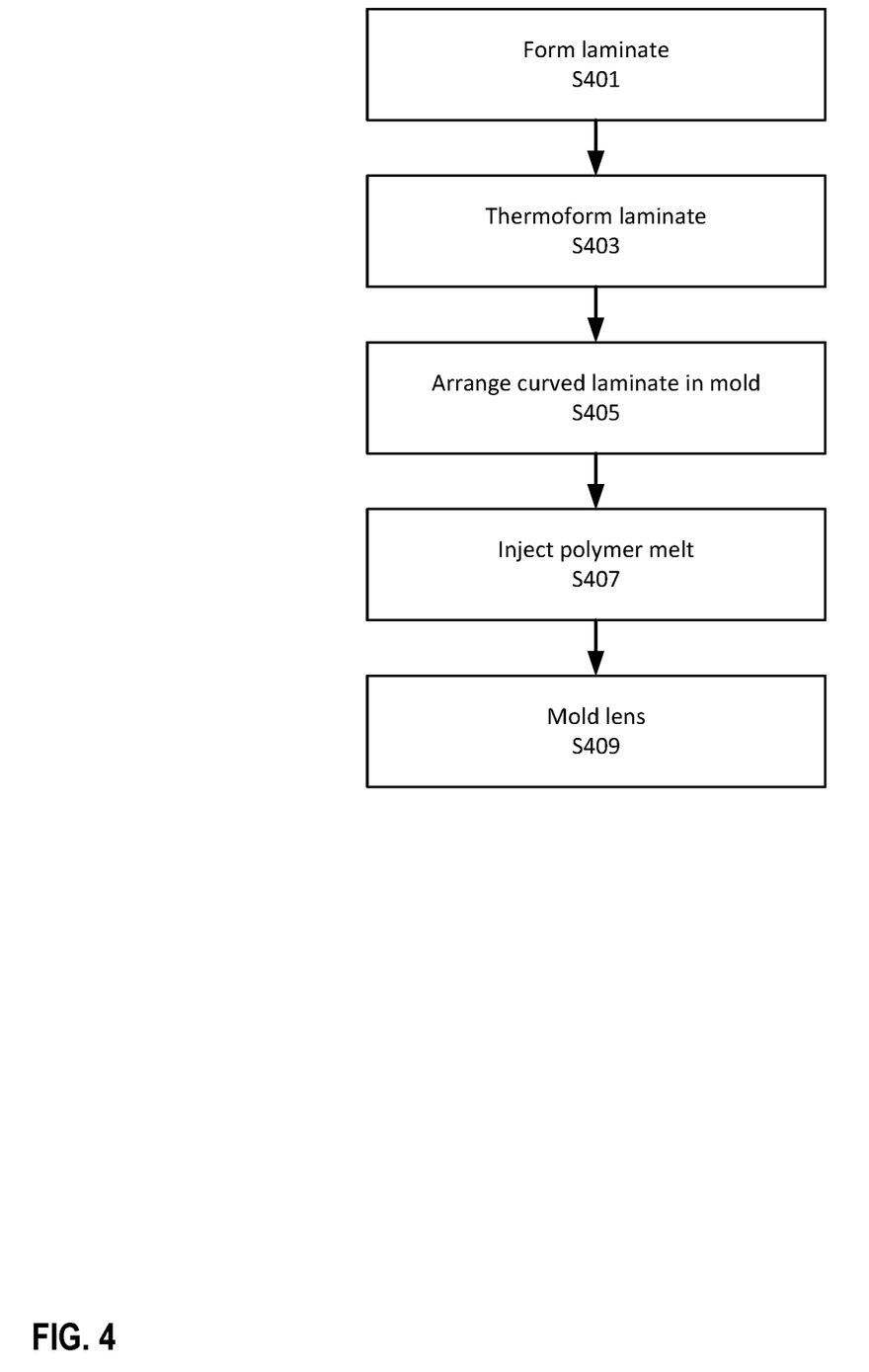
FIG. 4 is a flow chart for a method of fabricating an ophthalmic lens, according to an embodiment of the present disclosure.

FIG. 4 is a flow chart for a method of fabricating an ophthalmic lens, according to an embodiment of the present disclosure. In step S401, the flat laminate wafer 100 is formed. For example, the flat laminate wafer 100 can be formed via adhesive lamination, extrusion lamination, adhesive coating lamination, or any other known method. The flat laminate wafer 100 can include, for example, three layers with the center layer 120 being a thermoplastic elastomer and one or both of the first and second layers 115, 125 being the stretched polymer. In step S403, the flat laminate wafer 100 is formed into the thermoformed laminate wafer 105. A thermoforming device may be used to modify the curvature and shape of the flat laminate wafer 100 prior to molding in the molding device. In step S405, the thermoformed laminate wafer 105 is arranged into the molding device. For example, the thermoformed laminate wafer 105 is placed adjacent to the concave mold insert 130 such that the convex side of the thermoformed laminate wafer 105 faces the concave mold insert 130. The concave mold insert 130 can secure the thermoformed laminate wafer 105 via a vacuum force. The mold sides 145*a*, 145*b* can be pushed together to couple and form a seal. In step S407, the polymer melt 140 can be injected into the cavity of the mold device between the thermoformed laminate wafer 105 and the convex mold insert 135. In step S409, the lens is molded via the cooling of the polymer melt 140 in the mold device. The heat and pressure from the polymer melt 140 can be transferred to the stretched polymer of the first layer 115, leading to the first layer 115 shrinking and receding from the edge of the lens. The shrinking of the first layer 115 can lead to a concomitant recession of the edge of the center layer 120. The heat from the polymer melt 140 can additionally heat the thermoformed laminate wafer 105 in order to further mold the thermoformed laminate wafer 105 against the curvature of the concave mold insert 130. It may be appreciated that this method can be utilized to form "flat" eyeglass lenses, plano eyeglass lenses, prescription eyeglass lenses, and "high wrap" sunglasses and goggles.

As previously mentioned the stretched polymer can be stretched polycarbonate. Furthermore, the stretched polymer can be mono-axially or bi-axially stretched. For the bi-axially stretched polymer, the two-dimensional shrinkage during fabrication of the lens can include the following advantages: i) keeping the thermoformed laminate wafer 105 centered in the concave and convex mold inserts 130, 135, ii) providing a separation distance between the edge of the thermoformed laminate wafer 105 and the sidewalls of the mold device cavity, iii) allowing the first layer 115 and the center layer 120 to be encapsulated by the injected polymer melt 140 upon shrinkage, iv) pin-in-place a front edge of the thermoformed laminate wafer 105 against the concave mold insert 130 as the cavity is filled, v) prevent displacement of the thermoformed laminate wafer 105 away from an initial location before filling, and vi) preferential alignment of the thermoformed laminate wafer 105 within the cavity via the alignment tab.

General advantages include the following: i) simple, low cost wafer die cutting process that produces a clean wafer edge (little-to-no TPE at edge of wafer), ii) wafer designs follow lens molding by a standard PC polarized lens overmolding process, iii) encapsulated outflow region at the edge of the lens may be left as part of the final lens product after injection molding, or it can be removed by grinding it away (cribbing), iv) final lens product made by this wafer containment method can be a photochromic lens, a polarized lens, or any other functional lens that contains a contaminating material or adhesive in any film or laminate construction, v) the contaminating center layer 120 can be a photochromic film or adhesive that melt flows under the influence of heat and pressure, and vi) the method can be used in a wafer injection molding, overmolding, mold casting or surface casting process.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

Embodiments of the present disclosure may also be as set forth in the following parentheticals.

(1) A method of forming an ophthalmic laminate lens, comprising forming a planar laminate by adhering a first stretched polymer layer to a first side of a thermoplastic elastomer layer, and adhering a second polymer layer to a second side of the thermoplastic elastomer layer, the first stretched polymer layer having a thickness greater than 250 μm, the second polymer layer having a thickness greater than 250 μm, and the thermoplastic elastomer layer having a thickness in a range of 15 μm to 150 μm; thermoforming the planar laminate into a curved laminate, the curve laminate having a pre-molding curvature; arranging the curved laminate in a mold; and molding, via the mold set at a predetermined temperature and a predetermined pressure, the curved laminate with a polymer melt into a curved lens, wherein a temperature of the polymer melt is above a stretch temperature of the first stretched polymer layer.

(2) The method of (1), wherein the mold includes a concave mold insert and a convex mold insert, the curved laminate is arranged in the mold such that the second polymer layer is adjacent to the concave mold insert, and the polymer melt is injected between the first stretched polymer layer of the curved laminate and the convex mold insert.

(3) The method of either (1) or (2), wherein the first stretched polymer is mono-axially stretched polycarbonate.

(4) The method of any one of (1) to (2), wherein the first stretched polymer is bi-axially stretched polycarbonate.

(5) The method of any one of (1) to (4), wherein the second polymer layer is a stretched polymer and mono-axially stretched.

(6) The method of any one of (1) to (4), wherein the second polymer layer is a stretched polymer and bi-axially stretched.

(7) The method of any one of (1) to (6), wherein the thickness of the first stretched polymer layer and the thickness of the second polymer layer are each in a range of greater than 250 μm to 800 μm.

(8) The method of any one of (1) to (7), wherein the thickness of the first stretched polymer layer is substantially equal to the thickness of the second polymer layer.

(9) The method of any one of (1) to (8), wherein the thickness of the thermoplastic elastomer layer is in a range of 25 μm to 75 μm.

(10) The method of any one of (1) to (9), wherein the thermoformed curved laminate has a base curve greater than 5.0 D.

(11) The method of any one of (1) to (10), wherein a material of the thermoplastic elastomer layer is thermoplastic polyurethane or polyether-block-polyamides.

(12) The method of any one of (1) to (11), wherein a diameter of the first stretched polymer layer narrows to less than a diameter of the second polymer layer upon heating above the stretch temperature.

(13) The method of any one of (1) to (12), wherein the polymer melt encapsulates the first stretched polymer layer and the thermoplastic elastomer layer against the second polymer layer.

(14) An ophthalmic lens laminate, comprising a first stretched polymer layer having a thickness greater than 250 μm; a second polymer layer having a thickness greater than 250 µm; and a thermoplastic elastomer layer having a thickness in a range of 15 µm to 150 µm, the thermoplastic elastomer layer being disposed between the first stretched polymer layer and second polymer layer, the thermoplastic elastomer layer being bonded to the first stretched polymer layer on a first side of the thermoplastic elastomer and bonded to the second polymer layer on a second side of the thermoplastic elastomer layer.

(15) The ophthalmic lens laminate of (14), wherein the thickness of the first stretched polymer layer is substantially equal to the thickness of the second polymer layer.

(16) The ophthalmic lens laminate of either (14) or (15), wherein the thickness of the first stretched polymer layer and the thickness of the second polymer layer are each in a range of greater than 250 µm to 800 µm.

(17) The ophthalmic lens laminate of any one of (14) to (16), wherein the first stretched polymer is mono-axially stretched polycarbonate.

(18) The ophthalmic lens laminate of any one of (14) to (16), wherein the first stretched polymer is bi-axially stretched polycarbonate.

(19) The ophthalmic lens laminate of any one of (14) to (18), wherein the thickness of the thermoplastic elastomer layer is in a range of 25 µm to 75 µm.

(20) The ophthalmic lens laminate of any one of (14) to (19), wherein a material of the thermoplastic elastomer layer is thermoplastic polyurethane or polyether-block-polyamides.

What is claimed is:

1. A method of forming an ophthalmic laminate lens, comprising:
    forming a planar laminate by adhering a first stretched polymer layer to a first side of a thermoplastic elastomer layer, and adhering a second polymer layer to a second side of the thermoplastic elastomer layer, the first stretched polymer layer having a thickness greater than 250 µm, the second polymer layer having a thickness greater than 250 µm, and the thermoplastic elastomer layer having a thickness in a range of 15 µm to 150 µm;
    thermoforming the planar laminate into a curved laminate, the curved laminate having a pre-molding curvature;
    arranging the curved laminate in a mold; and
    molding, via the mold set at a predetermined temperature and a predetermined pressure, the curved laminate with a polymer melt into a curved lens, wherein
        a temperature of the polymer melt is above a stretch temperature of the first stretched polymer layer.

2. The method of claim 1, wherein:
    the mold includes an concave mold insert and a convex mold insert;
    the curved laminate is arranged in the mold such that the second polymer layer is adjacent to the concave mold insert; and
    the polymer melt is injected between the first stretched polymer layer of the curved laminate and the convex mold insert.

3. The method of claim 2, wherein the first stretched polymer is mono-axially stretched polycarbonate.

4. The method of claim 2, wherein the first stretched polymer is bi-axially stretched polycarbonate.

5. The method of claim 2, wherein the second polymer layer is a stretched polymer and mono-axially stretched.

6. The method of claim 2, wherein the second polymer layer is a stretched polymer and bi-axially stretched.

7. The method of claim 1, wherein the thickness of the first stretched polymer layer and the thickness of the second polymer layer are each in a range of greater than 250 µm to 800 µm.

8. The method of claim 7, wherein the thickness of the first stretched polymer layer is substantially equal to the thickness of the second polymer layer.

9. The method of claim 1, wherein the thickness of the thermoplastic elastomer layer is in a range of 25 µm to 75 µm.

10. The method of claim 1, wherein the thermoformed curved laminate has a base curve greater than 5.0 D.

11. The method of claim 1, wherein a material of the thermoplastic elastomer layer is thermoplastic polyurethane or polyether-block-polyamides.

12. The method of claim 1, wherein a diameter of the first stretched polymer layer narrows to less than a diameter of the second polymer layer upon heating above the stretch temperature.

13. The method of claim 1, wherein the polymer melt encapsulates the first stretched polymer layer and the thermoplastic elastomer layer against the second polymer layer.

14. An ophthalmic lens laminate, comprising:
    a first stretched polymer layer having a thickness greater than 250 µm;
    a second polymer layer having a thickness greater than 250 µm; and
    a thermoplastic elastomer layer having a thickness in a range of 15 µm to 150 µm, the thermoplastic elastomer layer being disposed between the first stretched polymer layer and second polymer layer, the thermoplastic elastomer layer being bonded to the first stretched polymer layer on a first side of the thermoplastic elastomer and bonded to the second polymer layer on a second side of the thermoplastic elastomer layer.

15. The ophthalmic lens laminate of claim 14, wherein the thickness of the first stretched polymer layer is substantially equal to the thickness of the second polymer layer.

16. The ophthalmic lens laminate of claim 15, wherein the thickness of the first stretched polymer layer and the thickness of the second polymer layer are each in a range of greater than 250 µm to 800 µm.

17. The ophthalmic lens laminate of claim 14, wherein the first stretched polymer is mono-axially stretched polycarbonate.

18. The ophthalmic lens laminate of claim 14, wherein the first stretched polymer is bi-axially stretched polycarbonate.

19. The ophthalmic lens laminate of claim 14, wherein the thickness of the thermoplastic elastomer layer is in a range of 25 µm to 75 µm.

20. The ophthalmic lens laminate of claim 14, wherein a material of the thermoplastic elastomer layer is thermoplastic polyurethane or polyether-block-polyamides.

* * * * *